(12) United States Patent
Fukuhara (10) Patent No.: US 11,942,073 B2
(45) Date of Patent: Mar. 26, 2024

(54) EMERGENCY SERVICE REQUEST SYSTEMS AND METHODS

(71) Applicant: T-Mobile USA, Inc., Bellevue, WA (US)

(72) Inventor: Kevin Fukuhara, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 753 days.

(21) Appl. No.: 16/457,516

(22) Filed: Jun. 28, 2019

(65) Prior Publication Data

US 2020/0410984 A1    Dec. 31, 2020

(51) Int. Cl.
*G06F 17/00* (2019.01)
*G06F 3/0482* (2013.01)
(Continued)

(52) U.S. Cl.
CPC .......... *G10L 15/005* (2013.01); *G06F 3/0482* (2013.01); *G06F 16/9035* (2019.01); *G06F 40/263* (2020.01); *H04M 3/5116* (2013.01); *H04W 4/025* (2013.01); *G06Q 50/26* (2013.01); *H04M 2203/2061* (2013.01)

(58) Field of Classification Search
CPC .............. H04W 4/025; H04M 3/5116; H04M 2203/2061; H04M 3/51; H04M 3/515; H04M 3/5125; H04M 3/527; H04M 3/50; G06Q 50/26; G06Q 50/265; G06F 3/04883; G06F 13/1605; G06F 16/955; G06F 1/3206; G06F 1/3209; G06F 11/0796; G06F 16/9035; G06F 40/263; G06F 2209/5021; G06F 3/0482; G06F 16/903; G06F 16/9032; G06F 16/90335; G06F 40/10; G06F 40/20; G06F 3/048; G06F 40/51; G06F 40/40; G06F 40/47; G06F 40/58; G06F 40/253;
(Continued)

(56) References Cited

U.S. PATENT DOCUMENTS 6,035,187 A   3/2000 Franza
6,078,804 A   6/2000 Alperovich et al.
(Continued)

FOREIGN PATENT DOCUMENTS

WO   WO-2019155370 A1 * 8/2019

OTHER PUBLICATIONS

Hamill, M., Young, V., Boger, J. et al. Development of an automated speech recognition interface for personal emergency response systems. J NeuroEngineering Rehabil 6, 26 (2009). https://doi.org/10.1186/1743-0003-6-26 (Year: 2009).*

*Primary Examiner* — Michael Ortiz-Sanchez
(74) *Attorney, Agent, or Firm* — Lee & Hayes P.C.

(57) ABSTRACT

An emergency service request system that allows a user to effectively and/or efficiently provide information regarding an emergency situation to an emergency response center. The system presents a series of prompts to a user based on the user's preferred language, with each prompt having one or more prepopulated responses that are selectable by the user in response to the prompt. The user's responses to the prompts are prepared and formatted into a message that is transmitted to an emergency response center. The message contains the user-provided information regarding the emergency situation and the information is provided in a preferred language of the emergency response center.

20 Claims, 5 Drawing Sheets

(51) Int. Cl.
*G06F 16/9035* (2019.01)
*G06F 40/263* (2020.01)
*G10L 15/00* (2013.01)
*H04M 3/51* (2006.01)
*H04W 4/02* (2018.01)
G06Q 50/26 (2012.01)

(58) Field of Classification Search
CPC ... G06F 40/232; G06F 40/268; G10L 15/005; G10L 19/00
See application file for complete search history.

(56) References Cited

U.S. PATENT DOCUMENTS

| | | | |
|---|---|---|---|
| 6,526,335 B1* | 2/2003 | Treyz | H04W 4/029 |
| | | | 701/1 |
| 7,991,383 B2 | 8/2011 | Islam et al. | |
| 9,491,604 B2 | 11/2016 | Michael | |
| 2008/0226039 A1* | 9/2008 | Goldman | H04M 3/527 |
| | | | 379/45 |
| 2009/0296898 A1* | 12/2009 | Ragno | G06Q 10/06 |
| | | | 379/45 |
| 2014/0358524 A1* | 12/2014 | Papula | G06F 40/51 |
| | | | 704/9 |
| 2017/0188216 A1* | 6/2017 | Koskas | H04W 4/025 |
| 2018/0165275 A1* | 6/2018 | Kochura | G06F 40/58 |
| 2018/0310159 A1* | 10/2018 | Katz | H04W 4/50 |
| 2019/0147721 A1* | 5/2019 | Avitan | G06F 1/3209 |
| | | | 340/573.1 |
| 2019/0313230 A1* | 10/2019 | MacGabann | G16H 40/67 |

* cited by examiner

EMERGENCY SERVICE REQUEST SYSTEMS AND METHODS

BACKGROUND

When facing an emergency situation, the first instinct of many people is to contact emergency services for assistance. Often, this involves dialing a telephone number associated with an emergency dispatch center and, more recently, the option to text message with the emergency dispatch center. For native speakers, the voice and text options are perfectly adequate when they need to request emergency assistance. As native speakers, they can communicate effectively and efficiently with the emergency response center to provide the necessary information regarding their emergency situation. Likewise, the emergency response center can accurately communicate with the caller since they speak the same language, allowing the center to ask questions that are readily understood and comprehended by the caller. However, for non-native speakers, contacting emergency services can be a daunting prospect due to the language barrier. The non-native speakers may struggle to understand and respond to questions posed by a dispatcher and, similarly, the dispatcher may struggle to understand information provided by the non-native speaker due to the language barrier. This language barrier can add significant delays in the emergency services being able to address an emergency situation and/or can significantly decrease the efficiency/effectiveness of such communications. Such difficulties can cause non-native speakers to be hesitant to contact emergency services and/or can pose an increased danger to life and/or property due to the difficulties with communication. There exists a need for a system that allows, or assists with, non-native speakers contacting and requesting emergency services in an efficient and effective manner.

DETAILED DESCRIPTION

Described herein are systems and methods for contacting and communicating with emergency services, such as for requesting assistance. The systems and methods provide efficient and effective communication between the requester and the emergency services, such as a Public Safety Answering Point (PSAP), particularly for requesters that speak/communicate comfortably in a language other than that of the emergency services. A language barrier can cause a delay in receiving emergency services and/or decrease the effectiveness and/or efficiency of the response by the emergency services. The systems and methods described below provide a means for triaging a request for emergency assistance, including collecting adequate/pertinent information regarding the request, in a preferred language of the requester. The systems and methods can then provide the request and/or details regarding the request to the emergency services in the preferred language of the emergency services. In this manner, each party is communicating in their preferred language, which reduces potential ambiguity and misunderstandings. Using these systems and/or methods, emergency services are better able to effectively and/or efficiently respond to requests for emergency assistance, especially to those by non-native speakers.

The system can include an application on a user device that interacts with a network, and/or resources/systems thereof, to collect/solicit information from the user regarding the user's emergency situation. The information collection environment is presented in the preferred language of the user which assists with effectively, efficiently, and/or accurately collecting information from the user. The user-provided information is then prepared and/or formatted to a data structure and/or language preferred/required by a PSAP, to which the information will be transmitted to assist with dispatching emergency services and/or otherwise responding to the user's emergency situation. The application can be installed on the user's device by the user, such as through an application storefront, or can be included on the user device, such as by a manufacturer or user's network provider, as part of the operating system of the user's device. In an emergency situation, the user can open/launch the application to provide information to and/or communicate with emergency services, such as a PSAP. Alternatively, or additionally, the application can be launched/opened automatically, such as when the user device determines the user is attempting to contact emergency services, such as by dialing 9-1-1, when the user has potentially experienced an injury determined from one or more sensors of the user device and/or other inputs or situational/environmental changes indicative of a user's need for emergency services.

The preferred language of the user can be provided by the user and/or stored for retrieval by the system, application, and/or PSAP. The user can provide a preferred language when establishing/setting-up a user account, such as on a cellphone network, and the user's preferred language can be stored in a user profile/subscriber account on the network. In another embodiment, the user can provide a preferred language to the application and the user's preferred language selection can be stored by the application. Alternatively, the user can provide a preferred language when queried to do so. The user's preferred language can be accessed/retrieved when the user is interacting with the system to allow the system to present various information and/or triage prompts in the user's preferred language. The preferred language environment of the system reduces the language barrier for a non-native speaking user and assists the user with effectively, efficiently, and/or accurately communicating with emergency services, such as a PSAP.

The system can include systems, methods, and/or capabilities to allow the system to, or assist with, prioritizing/triaging a user's request for emergency services. Based on information provided by or collected from a user, the system can prioritize the emergency service request of the user. The prioritization/triaging of incoming emergency service requests can assist the emergency services, such as a PSAP, in allocating appropriate resources to the user's request. Additionally, this can assist the emergency services with increasing the effectiveness and/or efficiency of responding to emergency situations and/or requests for emergency services.

Figure 1:
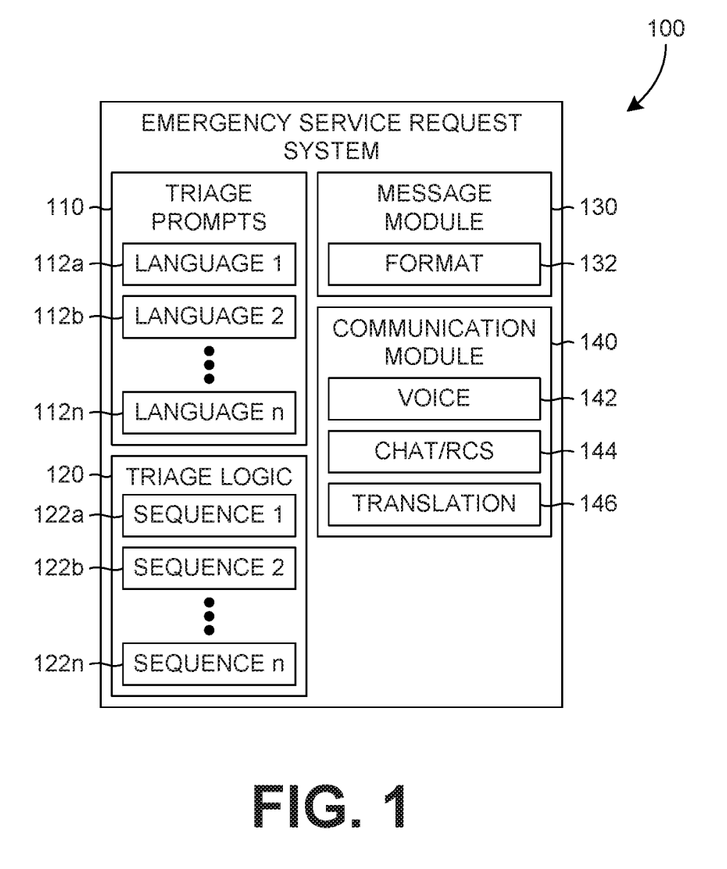
FIG. 1 is an example emergency service request system.

FIG. 1 is an example emergency service request system 100 that includes triage prompts 110, triage logic 120, a message module 130 and a communication module 140. The emergency service request system 100 can assist a user with requesting an emergency service, particularly when the user is a non-native speaker or is otherwise unable or has diminished capacity to communicate verbally with emergency responders in the native language of the emergency responders. For example, a user can have hearing loss/deafness which can cause the user difficulties when using a phone, such as when calling to request emergency services. The emergency service request system 100 can assist people like the example user who may struggle to use the conventional means of contacting/interacting with emergency services. Another example user can include users that are in an accident or incident and suffer injuries or trauma that make it difficult for the user to adequately communicate with/request emergency services, such as speaking or hearing impairments due to the user's injuries. User's having such difficulties can use the emergency service request system 100 to effectively and/or efficiently communicate a need for emergency services. The triage prompts 110 can be presented in a preferred language of the user and the user can be provided various response options associated with each triage prompt 110 to allow the user to effectively and efficiently communicate details regarding the particular emergency for which the user is requesting service or assistance. The information provided by the user can be transmitted to a PSAP, or emergency dispatch center/service, so that the needed emergency services can be dispatched to assist the user. The emergency service request system 100 can prepare the user information, such as translating and/or formatting, in a form receivable/acceptable by the PSAP.

The triage prompts 110 can be various questions and/or statements that are used to assist with gathering information from a user. Each of the triage prompts 110 can include one or more responses that can be selectable by the user to provide information regarding the user's emergency service need. For example, a triage prompt 110 can include a statement inquiring if the user's emergency need is related to fire, medical and/or police. The user can select one or more of the options—fire, medical, or police—and that selection can be used by the emergency services request system 100, and/or a PSAP, to assist with requesting/dispatching resources to assist the user.

The content of the triage prompts 110, such as the questions, statements and/or responses, can be developed by/with another party, such as one or more PSAPs. The involvement of the PSAP(s) in creating/generating triage prompts 110 can assist with creating triage prompts 110 that gather/receive information the PSAP requires/desires for dispatching emergency services in response to a request. For example, a rural PSAP may require/desire triage prompts 110 that are different than those of an urban PSAP, such as due to the nature of the environment in which the emergency services will be responding and/or due to the likelihood of the differing emergency situations each of the PSAPs will be providing emergency services to/for. The triage prompts 110 provided to the user can be based on the PSAP that will be responding to/handling the request for emergency services, which can be determined from a location provided by the user and/or determined from a location service.

To assist non-native speakers, for example, that is users who do not speak fluently/confidently a language supported by the PSAP/emergency center, the triage prompts 110 can be in multiple languages, 112a, 112b . . . 112n. The user's preferred language can be determined and then triage prompts 110 corresponding to the user's language can be presented. Presenting the triage prompts 110 in the user's preferred language can assist with increasing the efficiency and accuracy of the information the user provides as part of the user's request for an emergency service(s).

The triage prompts 110 can be professionally translated into various languages 112a, 112b . . . 112n, in order to assist with the accuracy by which the user will read/perceive the triage prompt 110 presented in the preferred language of the user. The more accurate the translation of the triage prompt(s) 110 for the user, such as accounting for dialect and/or cultural nuances, the less ambiguity the user will have when comprehending the triage prompt 110, which can assist with the user in providing the requisite/desired information more accurately/effectively and receiving emergency services faster. The professional nature of the translations can assist with reducing comprehension difficulties a user may face when reading the translated triage prompt 110 by accounting for various cultural and/or language considerations through/by which the translated triage prompt 110 will be comprehended. Alternatively, various other translation programs/services can be used to translate the triage prompts 110 into the user's preferred language. Such translation services can provide an equally serviceable translation of the triage prompts 110; however, some of the provided translations may not have as much consideration regarding various nuances, such as cultural, dialect and/or other considerations. The triage prompts 110 can also be auto-translated, such as by an automated translation service/program, and the auto-translation can be used to prepopulate the triage prompts 110 with translations and/or translate the triage prompts 110 "on the fly," such as closely preceding the display of a translated triage prompt 110 to a user. However, the auto-translation provided may have a reduced user comprehension and/or increased user ambiguity.

The sequence in which various triage prompts 110 are provided/displayed to the user are based on the triage logic 120. The triage logic 120 can select various sequences, 122a, 122b . . . 122n, in which the triage prompts 110 are displayed based on various information, such as one or more characteristics of the user/requester, previous responses/information provided by the user/requester, and/or other information from one or more sources. The triage logic 120 can select an initial sequence 122a-122n, or starting triage prompt 110, and then can select, or switch to a different, sequence, or portion thereof, depending on various information received by the emergency service request system 100, such as a user's responses to one or more previous triage prompts 110.

Similar to the triage prompts 110, the triage logic 120 and/or one or more of the sequences 122a-122n, can be developed by/with another party such as a PSAP. Different PSAP(s) may require/desire differing information from the user requesting emergency services, and the triage logic 120 can be developed with/by the PSAP(s) so that the proper information is gathered/received. The selected sequence(s) 122a-122n of the triage prompts 110 can be based on the PSAP that will receive the emergency services request, which can be based on the location of the emergency, such as provided by the user and/or determined by/using location services. In this manner, the PSAP(s) can be provided an opportunity to configure the emergency service request system 100 to assist them with responding to emergency service requests.

The message module 130 formats 132 one or more messages to be sent by the emergency service request system 100 to the PSAP/emergency response center. To parse information from the message correctly, the PSAP can require that the information is relayed in the proper messaging format. The message module 130 can apply the correct formatting 132 based on the PSAP that will receive the message. The formatting 132 can structure the message so the receiving PSAP can interpret and/or parse the information contained therein, such as the user responses to one or more triage prompts 110. For example, the message module 130 can insert the received user response(s) to triage prompt(s) 110 into stored message templates to generate one or more messages to be sent to the PSAP, including the user-provided information regarding the user's request for emergency assistance. Alternatively, or additionally, the message module 130 can apply one or more formatting 132 rules to prepare a PSAP-compatible message containing the user provided information. The formatting 132, or formatting rule, can structure the user-provided information in a PSAP-preferred/required organizational/hierarchal data structure that assists the PSAP with receiving information through non-verbal communications.

In responding to a triage prompt 110, the user will select one or more of the prepopulated response options, which are presented in the user's preferred language. The message module 130 can correlate the user's selected response with the proper language translation of the response so that the information is provided to the PSAP is in the PSAP's preferred language. The message module 130 can select/generate a single PSAP-compatible response for each user response and/or can use one or more user responses to select/generate a single, or multiple, PSAP-compatible response in order to assist with the efficiency and/or clarity of the PSAP message. The selection/generation of a PSAP-compatible response by the message module 130 is based on the user response and can also include a consideration of various cultural aspects of the user's preferred language. Accounting for cultural aspects, such as dialect, idioms, etc., can assist in providing a clear and efficient communication to the PSAP that accurately conveys the user provided information.

The message module 130 can also include additional information in the message prepared for transmission to the PSAP. The additional information can include a location of the user/user device interacting with the emergency service request system 100, such as a location reported by the user device and/or a user device location determined by the network the user device is on, such as by triangulation, global positioning (GPS) and/or other location determining methods, programs/applications and/or systems. Other information regarding the user, such as information from a subscriber account of the user, can be included in the message. The emergency service request system 100 can access information regarding the user from the subscriber account associated with the user's device. The user's subscriber account/information can be stored on a network, such as a cellular/carrier network, that the user device is on/registered to and the network can be accessible by/to the emergency service request system 100 to allow the user's information to be retrieved. Alternatively, the emergency service request system 100 can cause the user's device to retrieve the user's information from the network, to which the user's device is connected, and then to provide the retrieved user information to the emergency service request system 100. Example user information can include a preferred language of the user, a physical address of the user, other contact information for the user, and/or other information regarding the user. The user information can be configured/supplied as part of an initial setup of the user's account and/or provided/updated after the user account has been established. In an example, the user can update or provide information regarding the user to the stored user account information through their user device, such as by a webpage or application.

The communication module 140 can establish, and/or facilitate, a communication session between the user and the PSAP/emergency response center. The communication session can include an audible and/or visual component to allow the user and the PSAP to communicate. Since the user and PSAP may not communicate in the same language and/or may have limited abilities to communicate in the same language, the communication module 140 can include a translation service 146 to assist the communications between the parties. Additionally, the communication module 140 can support multi-party communication allowing others to be involved with the discussion between the user and the PSAP. For example, the user can add a family member, friend, or contact to the communication session, and the added party can assist the user with communicating with the PSAP. In another example, the PSAP can add a party to the communication session, such as a human-translator or automated translation service, to assist in communication with the user.

The communication module 140 can establish a voice communication session 142 between the user and the PSAP. The voice communication session 142 can allow the user and PSAP, and/or other parties included in the communication session, to speak to each other. A translation service 146, such as an automated computer translation service and/or human translator, can be included in the voice communication session 142 to assist with communication between the user and PSAP. The automated computer translation service can be implemented using an API, plugin, or interface, of one or more translation services.

A chat/rich communication session (RCS) 144 can be established by the communication module 140 to allow the user, PSAP and/or others to communicate textually with each other. In the chat session, the user and PSAP can type/text messages to each other. As a rich communication session 144, the user and/or PSAP can include pictures, emoji and/or other pictographics in the communications. Additionally, the chat/RCS session 144 can include translation service(s) 146, such as by an automated computer translation service, to assist with communications between the user and PSAP. The textual nature of a chat/RCS session 144 can allow the user to communicate without speaking, which allows users who are physically restricted from, or have limited ability to, speak to communicate with the emergency response center. In an example, a user may have become injured and have a limited/restricted ability to communicate vocally, such a user can use the emergency service request system 100 and, optionally, the chat/RCS session 144 to provide information to the emergency response center. In another example, a user may be in a situation in which voice communication is unwise, such as during a physical altercation or home invasion. The emergency service request system 100 and, optionally, the chat/RCS session 144 can be used by the user to provide the emergency dispatch center with needed information and the user is not required to speak which could endanger the user.

As part of the translation 146, the communication module 140 can receive a confidence/likelihood of accuracy of the translation 146 provided by a translation service. The translation service can include a confidence of the provided translation and the confidence can be based on the number of alternative translations that the communication can be translated as. For example, a phrase/communication for translation can be translated by the translation service, such as an automated translation service, and the phrase/communication may have multiple different translations that can be associated with the phrase/communication. The more translations that can be made of the provided material, such as the phrase/communication, the lower the confidence may be that the provided translation is accurately representing the meaning/nature of the provided material. Machine learning and/or logic can also be included in the confidence assessment to further refine the confidence determination. For example, a phrase/communication may have multiple potential translations; however, if machine learning/logic determines that the majority of the translations agree, such as translating as substantially the same in meaning/nature, then the confidence of provided translation can be considered high. Based on the confidence of the translation, the communication module 140 can decide to query one or more additional translation services for further translation(s) of the communication. The communication module 140 can then decide which translation to provide based on the confidence of each translation and/or the similarity(s) between two or more of the translations.

For example, the communication module 140 can select the translation having the highest confidence or can select a translation that is substantially similar to a translation by one or more other translation services. Additionally, or alternatively, each of the translation services that are queried can have an associated trust that is indicative of the accuracy of the translations provided by the service. The trust of the translation service and the confidence of the translation can both be assessed by the communication module 140 to assist in selecting a translation to provide. By assessing the translations, the communication module 140 can assist with efficiency, accuracy and/or effectiveness of the communications between the user and PSAP.

Figure 2:
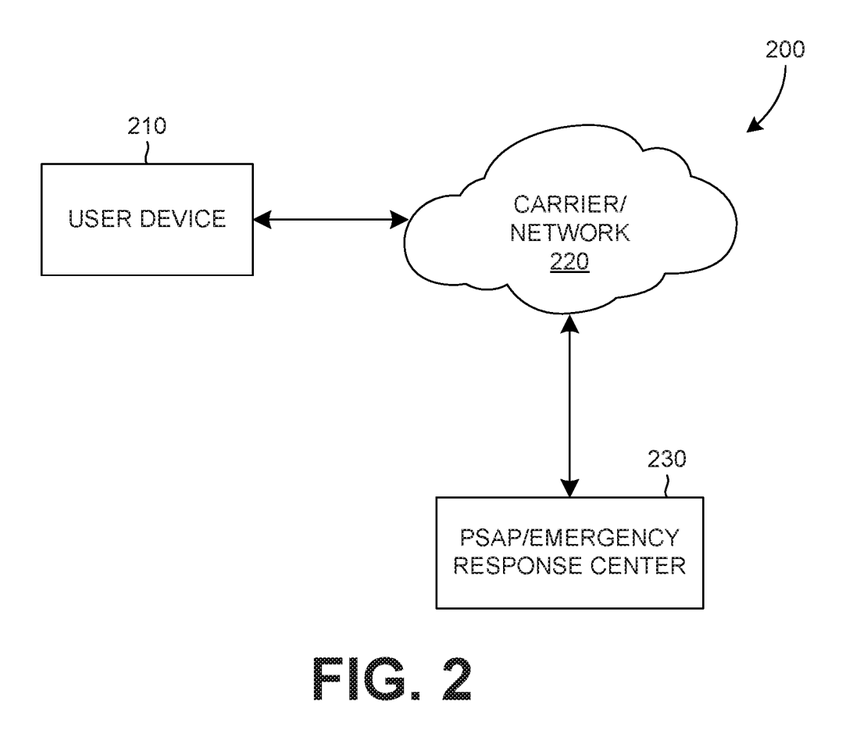
FIG. 2 is an example interaction of an emergency service request system.

FIG. 2 is an example interaction 200 of an emergency service request system. The interaction includes a user device 210, a carrier/network 220 and a PSAP/emergency response center 230. Communication between the user and the PSAP, such as a request for emergency assistance, is through the carrier/network 220. Such a request can be handled by/through a an emergency service request system, such as 100 of FIG. 1, which can be on one of, or distributed amongst, the user device 210, carrier/network 220 and/or the PSAP/emergency response center 230. In an example, the emergency response system can be on the network 220 and a user can interact with the system through the user device 210, such as through an application installed thereon, and the system can send messages regarding the user's request for emergency assistance from the carrier/network 220 to the PSAP/emergency response center 230.

Having the emergency service request system on the carrier/network 220 minimizes the resources required by the user/user device 210 and the PSAP/emergency response center 230, while assisting with clear and effective communication between them. The carrier/network 220 can be managed/owned by a carrier, such as a mobile telecommunication carrier, who can provide and/or maintain the infrastructure of the emergency service request system. Additionally, having the emergency service request system hosted on the carrier/network 220 allows the carrier/network 220 to provide necessary resources, such as hosting/communicating with one or more translation services, to support the emergency service request system. Alternatively, or additionally, the PSAP/emergency response center 230 can provide/maintain the emergency service request system, or a portion thereof.

As discussed, the user device 210 can include an application to access/interact with the emergency service request system. This application can be installed by a user and/or can be included with the operating system of the user device 210. As part of the application and/or user device setup, the user can select a preferred language that will be used for the user's interactions with the emergency service request system. The user preferred language can be transmitted to the emergency service request system when the user initiates contact with the system. Alternatively, or additionally, the user's preferred language can be part of a user profile, such as a subscriber account, on or accessible by, the carrier/network 220. A user's interaction with the emergency service request system can be initiated by the user selecting to run and/or access an application and/or by the user dialing/initiating contact with a PSAP. When the user device 210 and/or carrier/network 220 detects the user is contacting emergency services, such as a PSAP/emergency response center 230, and has a preferred language other than that of the PSAP, the user device 210 and/or carrier/network 220 can cause the emergency service request system to initiate interaction with the user.

Figure 3:
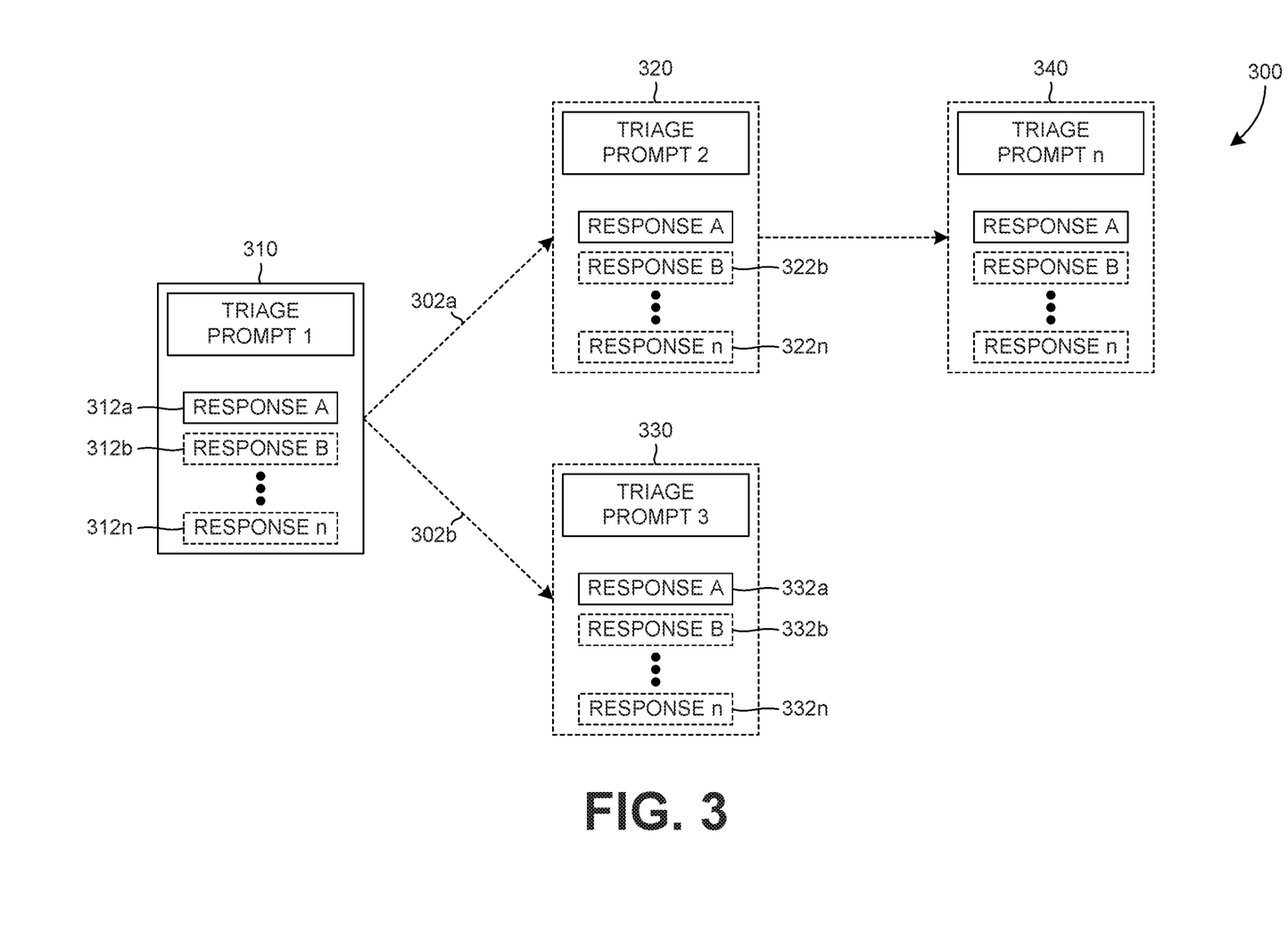
FIG. 3 is an example triage prompt sequence of an emergency service request system.

FIG. 3 is an example triage prompt sequence 300 of an emergency service request system. To assist a user with providing information regarding their request for emergency services, the system can present one or more triage prompts in a sequence. The triage prompts and/or their order can be selected by a triage logic that can use previously provided responses and/or other information to select a sequence(s) of triage prompts that are provided to the user, such as the triage prompt sequence 300. Example other information can be other information regarding the user, such as retrieved from a user's profile/account and/or information provided by the user's device. Information from the user's device can include sensed data from one or more sensors of the user's device and/or data obtained from an application of the user's device. Example user devices can include a smartphone or other personal smart device, such as a smart watch. These user devices are capable of sensing data regarding the user and/or their environment, which can include data regarding the health of the user themselves. This user/user environmental data can be provided to and/or accessed by the emergency service request system to assist with providing information regarding the user's emergency situation, which can be used to assist in selecting a triage prompt sequence 300 to provide the user.

For example, the user's device can be equipped with various sensors, such as an accelerometer, the data of which can be accessed by the emergency service request system to assist with selecting a sequence of the triage prompts. For example, an accelerometer of the user device can have previously recorded/reported motion consistent with the user traveling in a vehicle and a sudden and/or sharp deceleration can be detected by the accelerometer and interpreted as being indicative of a vehicular accident. This determination can be used by the emergency service request system to select an appropriate/likely triage prompt sequence 300.

In the example shown in FIG. 3, an initial triage prompt 310 is provided to a user. The initial triage prompt 310 is presented in the user's preferred language and includes one or more responses, 312a, 312b . . . 312n, that a user can select from based on the triage prompt 310. In an example, the initial triage prompt 310 may query the nature of the user's request, such as whether it is related to a fire, medical or police emergency.

Once a user has responded to the initial triage prompt 310, the triage prompt sequence 300 can proceed to the next triage prompt. The next triage prompt in the sequence 300 can be based on the user's response to the initial prompt 310, that is, the sequence 300 can proceed along path 302a to a second triage prompt 320 or along path 302b to an alternative triage prompt 330. Each of the triage prompts 320, 330 can include one or more responses, 322a, 322b ... 322n or 332a, 332b ... 332n, that a user can select from based on the triage prompt 320, 330.

The triage prompt sequence 300 can be terminated, such as after triage prompt 330 or can continue to further triage prompts 340, such as after triage prompt 320. Upon termination of the sequence, a communication session between the user and PSAP can be automatically or selectively initiated, such as by the user or PSAP. In an example, by default, the emergency service request system can open/establish a communication session between the user/user device and the PSAP. Alternatively, or additionally, the user device can provide a selectable option, such as an icon or button that a user can interact with to establish a communication session between the user and the PSAP. In another alternative, the PSAP can select to establish the communication sessions, such as based on the received information regarding the user's situation. For example, the PSAP may determine they have insufficient or incomplete information regarding the user's situation and require additional information. The PSAP can then establish the communication session with the user so that the additional and/or needed information can be obtained from the user.

Termination of the triage prompt sequence 300 can be based on there being no further relative triage prompts to display to the user based on the information the user has provided and/or the nature of the user's emergency service request. Additionally, in an example, a PSAP operator can be monitoring the information provided by the emergency service request system and can cause the system to initiate or proceed with a PSAP selected sequence of triage prompts, or a selected particular triage prompt. The option for a PSAP operator to select a triage prompt, or sequence of triage prompts, can be available to the PSAP operator at any point of the user's interaction with the emergency service request system or at a particular time in the interaction, such as upon termination of a triage prompt sequence, such as 300 of FIG. 3.

Figure 4:
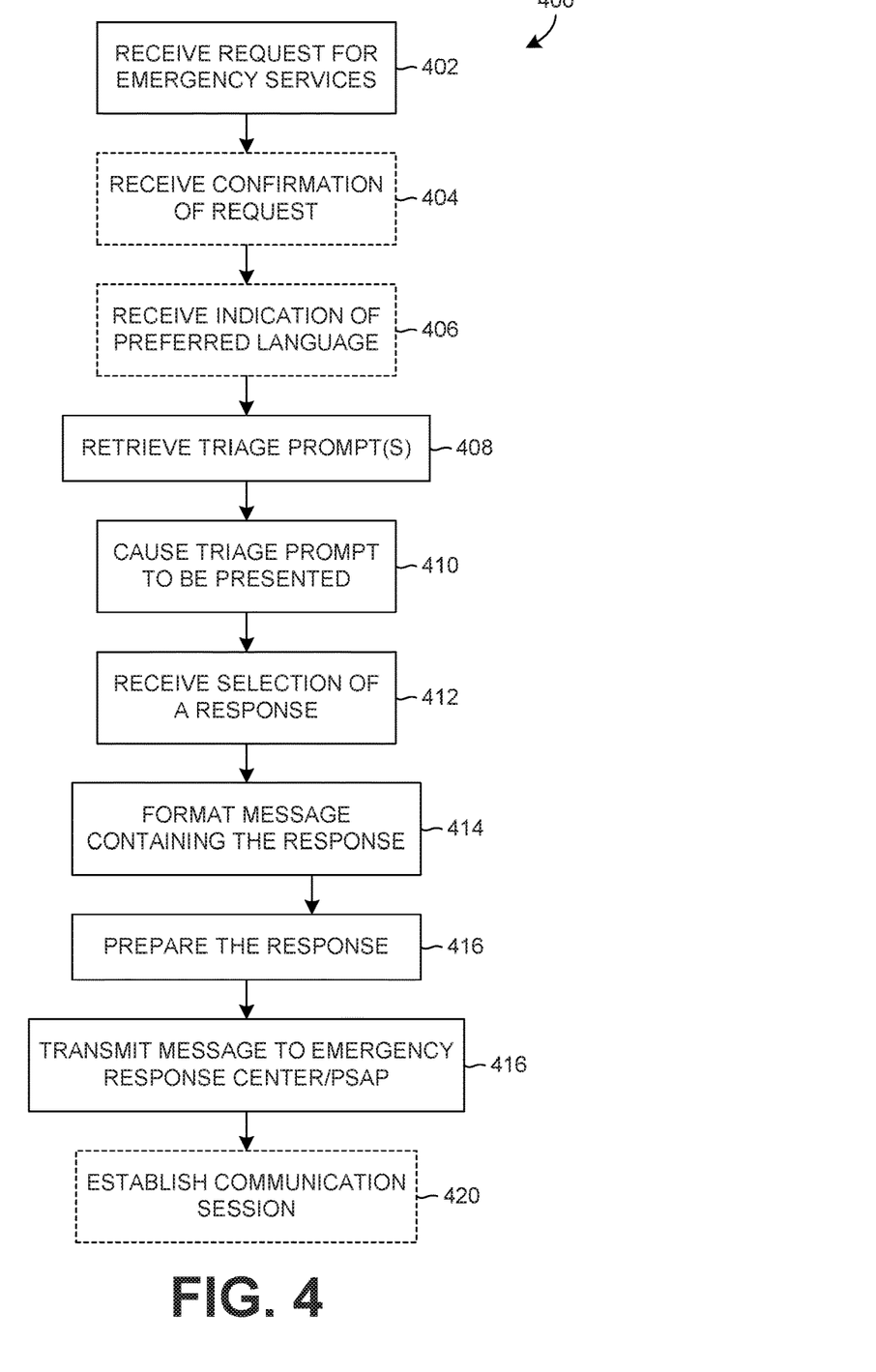
FIG. 4 is an example process of an emergency service request system.

FIG. 4 is an example process 400 of an emergency service request system. At 402, a request for emergency services is received. This request can be initiated by a user, such as through an application on a user device and/or by the user initiating communication with emergency services/PSAP. At 404, optionally, a confirmation of the request can be received. The confirmation can be used to prevent inadvertent requests from being initiated, such by an inadvertent launch of an application or dialing of emergency services. The user can be presented a confirmation and required to confirm their request for emergency services. To confirm that the request is valid, the user can provide an input, such as a selection, to continue the process of requesting emergency services. Alternatively, the confirmation process can be structured so that in the absence of a user input canceling the request, the request will proceed. This type of confirmation continues the request in the absence of any user intervention, such as in examples where the user may be unable to provide the necessary confirmation. The confirmation step/process can also include a timer that allots a preset amount of time for the user to confirm the request. Alternatively, upon expiry of the timer, the request will be continued if a user input has not cancelled the request.

At 406, optionally, an indication of the user's preferred language can be received. In an example, the preferred language indication can come from the user, the user's device, a profile of the user and/or from another source having the user's preferred language. Alternatively, the user's preferred language can be detected based on an audio sample that is captured and analyzed to determine the user's preferred language. In an example, the audio sample can be captured when the user calls 9-1-1 to contact an emergency service. At 408, one or more triage prompts can be retrieved. These triage prompts assist with triaging the user's request for emergency services and can be referred to as triage prompts.

At 410, the triage prompts are caused to be presented to the user, such as on the user's device. The triage prompts include one or more selectable responses. At 412, the user's selection of a response is received and at 414 a message containing the response can be formatted. Formatting the message can include preparing a message template that is acceptable/interpretable by the PSAP to which the message will be transmitted. At 416, the message can be prepared, which can include inserting the received response in the message, converting the response to a preferred language of the PSAP, adding additional information to the message, such as a user location or other user information, and/or other preparation of the message. At 418, the message is transmitted to the emergency response center/PSAP. In an example, a single message can be sent to the PSAP based on, and/or containing, the responses received from the user. In another example, multiple messages can be sent to the PSAP, with each message being based on/containing one or more received user responses.

At 420, optionally, a communication session between the PSAP, user and/or other parties can be established. This communication session can be established as the user is responding to the one or more triage prompts or upon completion of a sequence of triage prompts. During the communication session, the PSAP and user can communicate directly to request and/or provide additional information regarding the emergency for which the user is requesting services and/or other communications between the user and PSAP.

Figure 5:
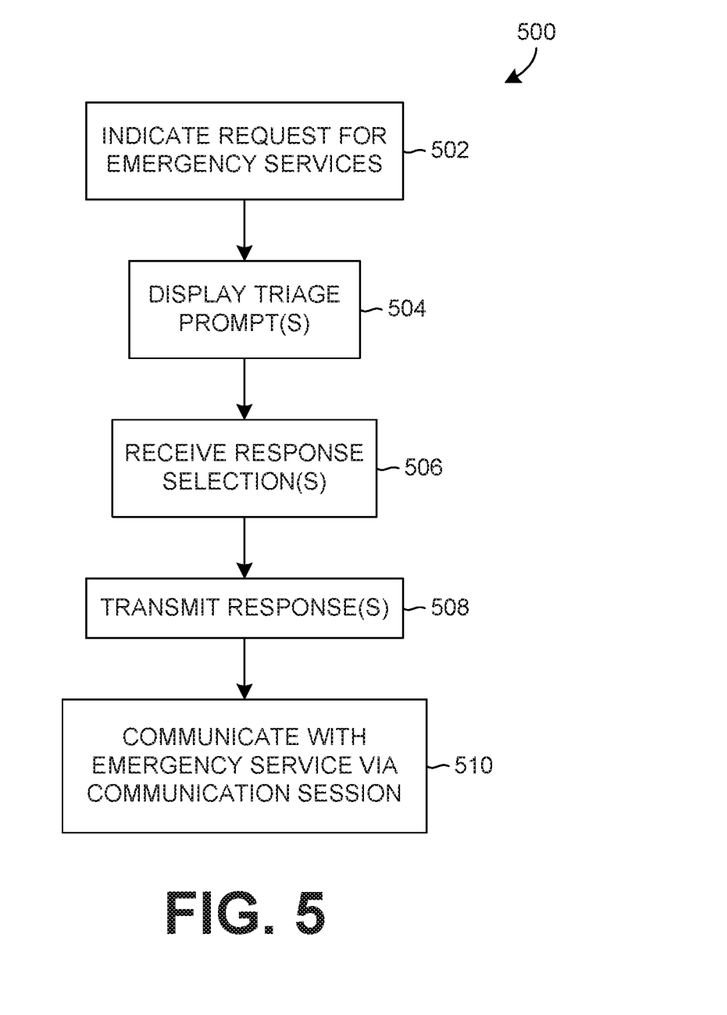
FIG. 5 is an example process of using an emergency service request system.

FIG. 5 is an example process 500 of using an emergency service request system. At 502, an indication of a request for emergency services is generated. This indication can be caused by a user interacting with an emergency service request system through a user interface/application on a user device. At 504, triage prompt(s) can be displayed, such as on the user device. The triage prompts can be provided by the emergency service request system after the system has received the indication of 502. At 506, response(s) to the triage prompt(s) are received. The user can interact with the user device to select a response for one or more of the triage prompts. These responses can be used to gather information from the user regarding the user's request for emergency services, such as the nature of the emergency and/or other information regarding the request. At 508, the response(s) are transmitted, such as to the emergency service request system.

The received data can be used by the system and/or a PSAP to determine the emergency services to provide the user, the severity of the user's emergency and/or other information regarding the user's emergency situation. At 510, a communication session can be established between the user and the PSAP/emergency response center. The communication session can allow the user and PSAP to communicate directly to allow each to provide information, such as regarding the emergency situation, and/or other communications to each other. Translation services, such as automated computer translation and/or human translators/ translation, can be provided during the communication session to assist with communication between the user and the PSAP.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A method of requesting an emergency service from an emergency service provider, the method comprising:
   in response to receiving from a requester a request for emergency services, sequentially retrieving sets of triage prompts, each triage prompt including at least a question having one or more prepopulated responses;
   causing to be sequentially presented, the sets of triage prompts;
   receiving respective selections for the sets of triage prompts from the requester, each selection including one or more of the prepopulated responses to the at least the question;
   based at least in part on the respective selections, determining that no further triage prompts are to be presented;
   in response to determining that no further triage prompts are to be presented, formatting the respective selections in a message for use by an emergency response center, the formatting including
     translating the respective selections from a preferred language of the requester to a preferred language of the emergency response center,
     receiving a confidence assessment of accuracy of the translation, and
     modifying the message based, at least in part, on the confidence assessment of the accuracy of the translation;
   transmitting the message to the emergency response center; and
   establishing a communication session between the requester and the emergency response center.

2. The method of claim 1, further comprising at least one of retrieving or receiving an indication of the preferred language of the requester, and wherein each of the triage prompts are in multiple languages and wherein the one or more retrieved triage prompts are retrieved based on the preferred language of the requester.

3. The method of claim 2, wherein the requester is communicatively coupled to a network and wherein the preferred language of the requester is retrieved from requester information stored on at least one of the network or a user device.

4. The method of claim 2, wherein the preferred language of the requester is provided by the requester in the received request.

5. The method of claim 1, further comprising at least one of retrieving or receiving an indication of the preferred language of the requester, and wherein the one or more retrieved triage prompts are retrieved and translated into the preferred language of the requester by an automated translation service.

6. The method of claim 5, wherein the indication of the preferred language of the requester is based, at least in part, on an audio sample that is captured from the request for emergency services.

7. The method of claim 1, wherein translating the selections from the preferred language is based, at least in part, on cultural aspects of the preferred language of the requester, wherein the cultural aspects include dialect and idioms.

8. The method of claim 1, wherein a location of the requester is included in the message.

9. The method of claim 1, wherein the communication session is a rich communication service (RCS).

10. The method of claim 1, wherein the communication session includes at least one of textual communication and voice communication.

11. The method of claim 1, wherein the requester is communicatively coupled to a network, the method further comprising:
    receiving instructions from the emergency response center for a user device of the requester to retrieve information about the requester from the network;
    providing the instructions to the user device;
    receiving the information about the requester; and
    providing the information about the requester to the emergency response center.

12. The method of claim 1, wherein the triage prompts are textual.

13. The method of claim 12, wherein the communication directed to the requester comprises text in the preferred language of the requester, the preferred language of the requester being different from a language of the textual triage prompts.

14. An emergency service request method, comprising:
    receiving, by an emergency service provider, a request for emergency service from a requester;
    selecting among a plurality of sequences of triage prompts to be presented to the requester, at least a portion of the selecting being based at least in part on responses of the requester to the triage prompts, wherein each of the triage prompts includes a prepopulated response;
    causing the selected sequences of triage prompts to be presented to the requester;
    receiving responses to the selected sequences of triage prompts from the requester;
    based at least in part on the responses from the requester, determining that no further triage prompts are to be presented;
    in response to determining that no further triage prompts are to be presented, preparing a message in an emergency message format of an emergency response center, the message including at least a portion of the responses from the requester;
    translating the responses from the requester from a preferred language of the requester to a preferred language of the emergency response center,
    receiving a confidence assessment of accuracy of the translation, and
    modifying the message based, at least in part, on the confidence assessment of the accuracy of the translation; and
    initiating a communication session between the requester and the emergency response center using the modified message.

15. The emergency service request method of claim 14, wherein the communication session is at least one of a textual communication session or a voice communication session.

16. The emergency service request method of claim 14, wherein the communication session includes an automated translation service that at least one of translates an input by the requester into the preferred language of the emergency response center or translates an input by the emergency response center to the preferred language of the requester.

17. The emergency service request method of claim 14, wherein each of the triage prompts is prepared in two or more languages.

18. The emergency service request method of claim 14, wherein the preferred language of the requester is based on an input provided by the requester.

19. The emergency service request method of claim 14, wherein the preferred language of the requester is retrieved from a user profile stored on a network communicatively coupled a user device of the requester.

20. A method of requesting an emergency service, comprising:

in response to receiving from a requester a request for emergency services, sequentially retrieving sets of triage prompts, each triage prompt including at least a question having one or more prepopulated responses;

causing to be sequentially presented, the sets of triage prompts;

accommodating a multi-party communication session that enables a third-party person to assist the requester in making respective selections for the sets of triage prompts;

receiving the respective selections for the sets of triage prompts, each selection including one or more of the prepopulated responses to the at least the question;

based at least in part on the respective selections, determining that no further triage prompts are to be presented;

in response to determining that no further triage prompts are to be presented, formatting each of the selections in a message to an emergency response center, the formatting structuring data within the message for use by the emergency response center;

transmitting the formatted message to the emergency response center;

establishing a communication session between the requester and the emergency response center;

preparing the selections for formatting based, at least in part, on a translation produced by translating the selections from a preferred language of the requester to a preferred language of the emergency response center;

receiving a confidence assessment of accuracy of the translation; and based, at least in part, on the confidence assessment of accuracy, modifying the sets of triage prompts.

\* \* \* \* \*